Jan. 29, 1952 O. P. MONSON 2,583,869
VALVE
Filed Sept. 30, 1947 2 SHEETS—SHEET 1
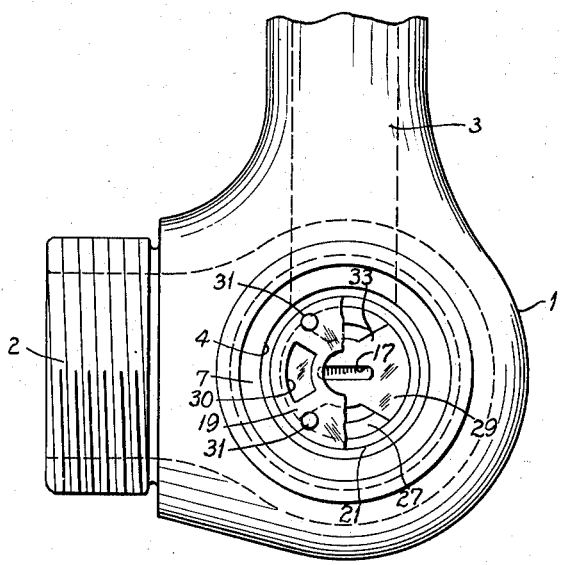
FIG.2.
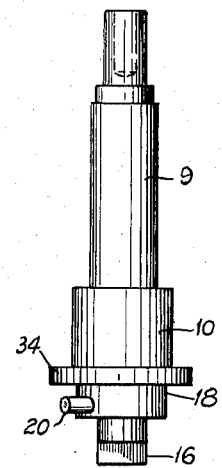
FIG.5.
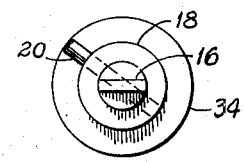
FIG.6.
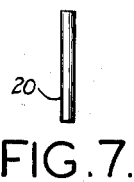
FIG.7.
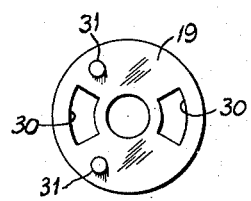
FIG.8. FIG.9.
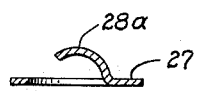
FIG.10.
Oscar P. Monson,
Inventor.
Koenig and Pope,
Attorneys.

Jan. 29, 1952     O. P. MONSON     2,583,869
VALVE

Filed Sept. 30, 1947     2 SHEETS—SHEET 2

Patented Jan. 29, 1952

2,583,869

UNITED STATES PATENT OFFICE 2,583,869

VALVE

Oscar P. Monson, Kenosha, Wis.

Application September 30, 1947, Serial No. 776,929

6 Claims. (Cl. 251—90)

This invention relates to faucets or more particularly to valves adapted to control the flow of fluid from a pipe line and suitable for use with wash basins, lavatories, kitchen sinks, drain boards and similar devices.

In commercial devices generally utilized at this time, one of the most distressing and common weaknesses is the fiber or rubber washer used for sealing and controlling the flow of fluid. Almost everyone is familiar with annoying leaky faucets and the effort required to replace a defective washer; also the potential damage occasioned by a washer becoming so worn, that the washer may crack permitting fluid to rush from the faucet discharge opening. Another annoying and extremely damaging result is the wearing down of the valve seat itself. This also may be due to a leaky washer with the wearing down of a valve seat occurring in a comparatively short time. The common procedure is to insert a new washer in the valve which, even if the seat is not worn, will be effective for only a limited time.

My invention has for its main object to provide a comparatively simple but highly efficient faucet or valve structure, whereby the essential valve parts are made entirely of rigid material, and which at no time necessitates the replacement or the use of a washer or element of similar characteristic which ordinarily seats in a valve and controls the flow of a fluid.

A more specific object is to provide a faucet or valve adapted to be removably mounted in a faucet body, the parts making up the valve being so closely fitted that there is no need for the rubber or fiber washer.

These and other objects of the invention will be apparent from the following description made in connection with the accompanying drawings, wherein like characters refer to similar parts through the several views, and in which:

Figure 2 is a top view of the faucet body and the mounting of the valve, the operating stem and its packing gland being removed and a valve plate broken away to show a valve closure plate.

Figure 5 is a side view of the valve stem.

Figure 6 is a bottom view of the valve stem.

Figure 7 is a view of the stop pin.

Figure 8 is top view of the valve top plate.

Figure 9 is a top view of the valve closure plate.

Figure 10 is a sectional view of the valve spring.

Figure 11 is a plan view of the retaining washer.

Figure 1:
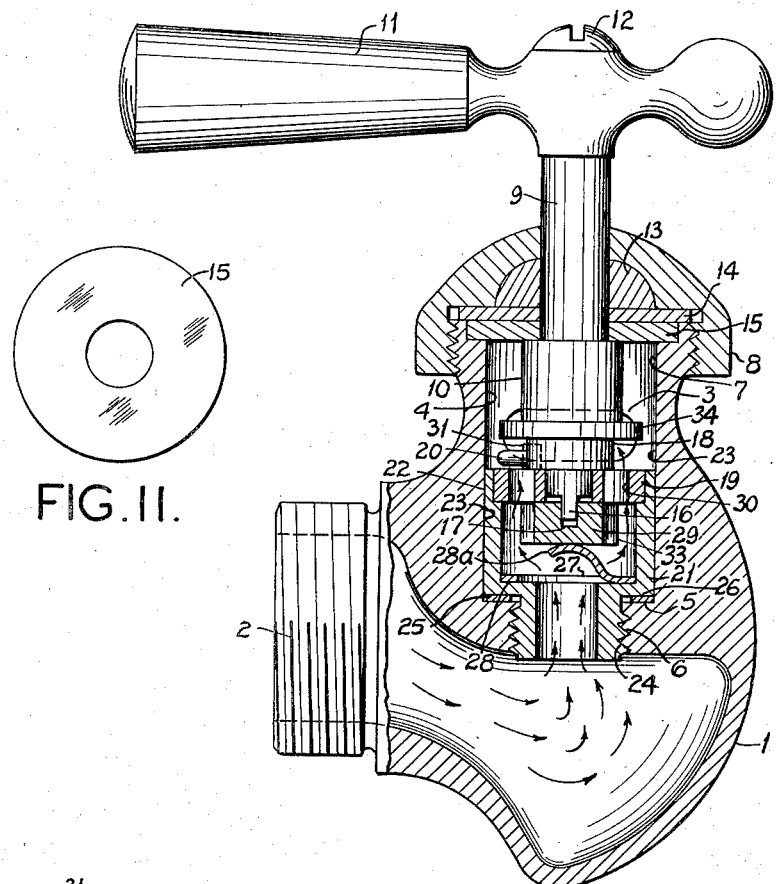
Figure 1 is a vertical section on an enlarged scale of a preferred embodiment of my invention.

In the embodiment illustrated in Figures 1 and 2, a faucet or valve having a body 1 is shown as having an intake passage 2 provided with a threaded outer end and extending to the lower portion of the body 1. An outlet passageway 3 extends from the upper and substantially central portion of the body 1.

The body 1 is counterbored to provide a centrally disposed and substantially cylindrically shaped inner opening or bore 4, a valve seat 5 and a threaded opening 6.

The open end 7 of the valve body opposite the opening 6 is threaded on its outer extremity for mounting the bonnet or packing nut 8.

Figure 4:
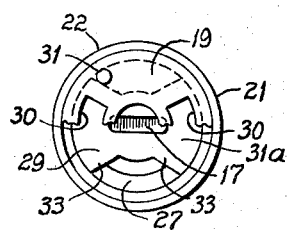
Figure 4 is a top view of the valve housing of Figure 3, the lower parts of a valve plate being broken away to expose parts of a closure plate.

The valve stem 9 is tapered at one end and provided with an internal thread. The above referred to valve stem end is inserted in a hole provided in handle 11 and held in the handle by a bolt or screw 12 which threadedly engages with the internal thread of the aforementioned valve stem. Packing rings 13 and 14 of well known design aid in providing an effective seal for preventing fluid escape through the top of the faucet body. The top of the body is counterbored to provide a seat for the valve stem retaining washer 15 illustrated in Figures 1 and 11. The valve stem 9 has an enlargement 10 which extends into the bore 4 and carries the enlarged circular retaining washer 15 bearing against and on the undersurface of the designated packing ring 14. Washer 15 bears on the top surface of enlargement 10 to keep the stem from rising. The end 16 of the valve stem as shown in Figure 5 is substantially rectangular in shape and is, in reality, a male coupling element or key for engagement in a female slot 17 provided in the valve closure plate 29 (Figures 2, 4 and 9). Collar 18 is mounted above key 16 and seats with the valve body top plate 19. Secured in flange 18, and arranged to extend at substantially right angles from the flange 18, is a stop pin 20 shown in Figure 7.

A baffle 34 is associated with the valve stem 10 and provides a regulating medium for the flow of fluid into passageway 3 whereby the flow is smooth and without violence; if this baffle were not provided the fluid would rush into passageway 3 with less-restricted force.

An inner cylindrically shaped valve housing 21 is mounted in the lower section of bore 4 with the side 22 of housing 21 closely bearing against the wall 23 of the bore 4. The housing 21 is provided with a threaded stud member 24 which is threaded into opening 6 of the body 1. A sealing gasket 25 is placed between the bottom 26 of the housing 21 and the bearing surface or valve seat 5 at the bottom of the bore 4. In operation, the housing 21 is screwed tightly down in the bottom of the bore 4 whereby no fluid can escape up along the wall surface 23 of the bore 4.

Figure 3:
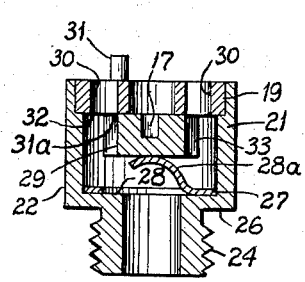
Figure 3 is a cross section of the valve housing or body.

The housing 21 is counterbored to provide a mounting for valve disc spring 27, the annular base of the spring resting on the inside surface 28 of the housing 21. Struck up over the central opening of the annular base of the spring 27 is an upwardly extending spring arm 28a engaged and retaining the elongate valve closure plate 29. This plate is of lobed or sector design as illustrated in Figure 9. Disposed immediately above the valve closure plate 29 and seated within the housing 21 is a stationary valve top plate 19 as heretofore referred to. This top plate 19 is provided with a plurality of openings 30 extending throughout the entire thickness of the top plate. Extending upwardly and at approximately right angles to the top surface of plate 19 are valve stem stop pins 31 similar to that shown in Figure 7. These pins are mounted firmly and extend upwardly at right angles from the top surface of plate 19. In operative position, the top surface 31a of valve closure plate 29 bears strongly enough against the bottom surface 32 of the top plate 19 so that the surfaces bear sufficiently closely to prevent any flow of fluid between the said surfaces. It is obvious from Figures 1 and 3 that the closure plate 29 is held in floating position between the spring arm 28a and the valve plate 19 and bears against the latter.

Figure 12:
Figure 12 is a cross-section of a modification of the valve housing.

When the faucet is mounted for operation the following conditions exist. The flat key shaped end 16 of valve stem 9 is inserted in the slot 17 of the valve plate 29 wherein it is loose and detachable. Normally, the sectors 33 of the disc 29 cover the slots or openings 30 of the top plate 19. Therefore, when it is desired to permit communication between the passage 2, openings 30 and passage 3, the valve stem is rotated by actuating handle 11, whereby the key 16 causes the valve closure plate to rotate. When this is done, the surfaces 33 uncover openings 30 permitting fluid to flow through the aforementioned passage 2, ports 30 and passage 3. The distance through which the valve stem may rotate is limited by the butting of pin 20 against pins 31. With this arrangement the closing and opening of slots or ports 30 are regulated at all times and the rotative movement of the valve stem is limited in scope. In Figure 12 there is shown a modification of the form of stud member depending from the bottom surface of the valve body 21. This arrangement contemplates pressing the stud 32a into the opening 6. Opening 6 then would not be threaded but comprise a bore with a substantially smooth wall surface so that the surface 33a of the stud would fit tightly and bear strongly against the wall surface.

It will be seen from the foregoing description that I have invented a simple but highly efficient valve or faucet structure, capable of wide general usage, and attaining new and improved results over the ordinary faucet structure commercially employed at this time.

It will, of course, be understood that various changes may be made in the form, details, materials, arrangement and proportions of parts without departing from the scope of the invention.

I claim:

1. A valve for faucets and the like comprising a body having an outlet and a pressure inlet surrounded by a seat, a single spring means located upon said seat, a fixed valve plate spaced from said seat and having a port therein, a rotary closure member located between said spring means and said valve plate and adapted to control said port, said closure member having a central first female coupling element in the form of a recess exclusively on its side of the valve plate, said valve plate having a central opening for access to said first coupling element, said spring means reacting between said seat and centrally on the closure member, and a rotary valve stem having a second male coupling element insertable through said opening in the fixed valve plate adapted for loose and detachable operative engagement with said first female coupling element in the closure member at a region exclusively on the pressure side of the valve plate.

2. A valve made according to claim 1 including stop means having a fixed element on the outlet side of the valve plate and an element attached to and movable with the lower end of said valve stem, said stop means being adapted to limit rotary movement of the valve stem and closure member.

3. A valve made according to claim 1 wherein the valve plate has several ports and the closure member is of elongate form for controlling said ports, and wherein said spring means comprises an annular portion located on said seat and a raised spring arm engaging only the central portion of the elongate closure member.

4. A valve made according to claim 1 wherein the valve plate has several ports and the closure member is of a form including sectors for controlling said ports respectively, said spring means comprising an annular ring located on said seat and a raised spring arm engaging only the central portion of the sectored closure member, and including stop means having a fixed element on the outlet side of the valve plate and a movable element attached to and movable with the lower end of the rotary valve stem, said stop means being adapted to limit rotary movement of the valve stem and the closure member.

5. A valve for faucets and the like comprising a hollow body construction having an outlet passage, and an inlet passage surrounded by a seat, a spring on said seat having a central port extending upward, a valve plate held stationary in said body and having ports therein, a closure plate having lateral sectors and located between the spring and the valve plate and being centrally contacted by the spring so as to be biased by the spring against the valve plate, the individual sectors of said closure plate being arranged to control individual ports respectively, a rotary valve stem, said valve plate having a central opening for access by the valve stem to said closure plate, loosely operative key means between the valve stem and the closure plate and located exclusively on the pressure side of the valve plate, the parts of which key means are freely separable by withdrawal of the valve stem from said opening, and stop means between the valve plate and the valve stem adapted to limit the extreme positions of the closure plate to ones wherein the sectors cover and uncover said ports.

6. A valve for faucets and the like comprising a hollow body construction having an outlet passage, and an inlet passage surrounded by a seat, a flat annular ring on said seat having a spring arm extending centrally upward, a valve plate held stationary in said body and having ports therein, a sectored closure plate between the spring arm and the valve plate and being centrally contacted by the spring arm so as to be biased against the valve plate, the individual sectors of said closure plate being arranged to control individual ports respectively, a rotary valve stem, said valve plate having a central opening for access by the valve stem to said closure plate, a key on the valve stem and a corresponding recess in the closure plate which may be loosely assembled and separated by application and withdrawal of the valve stem to and from said opening, and stop means consisting of a part on the valve plate and a part on the valve stem adjacent the key adapted to limit the extreme positions of the closure plate to ones wherein the sectors cover and uncover said ports, the parts of the stop means being assembled and separated by application and withdrawal of the stem to and from said opening.

OSCAR P. MONSON.

REFERENCES CITED

The following references are of record in the file of this patent:

UNITED STATES PATENTS

| Number | Name | Date |
| --- | --- | --- |
| 167,880 | Donning | Sept. 21, 1875 |
| 934,359 | Osbourn | Sept. 21, 1909 |
| 967,338 | Dehn | Aug. 16, 1910 |
| 1,163,370 | Ryan | Dec. 7, 1915 |
| 1,173,871 | Royer | Feb. 29, 1916 |
| 1,271,359 | Price | July 2, 1918 |
| 1,486,100 | McKenney | Mar. 4, 1924 |